Oct. 26, 1965  H. W. ANGELERY  3,213,887
DYNAMICALLY BALANCED VALVE
Filed Aug. 10, 1964  2 Sheets-Sheet 1
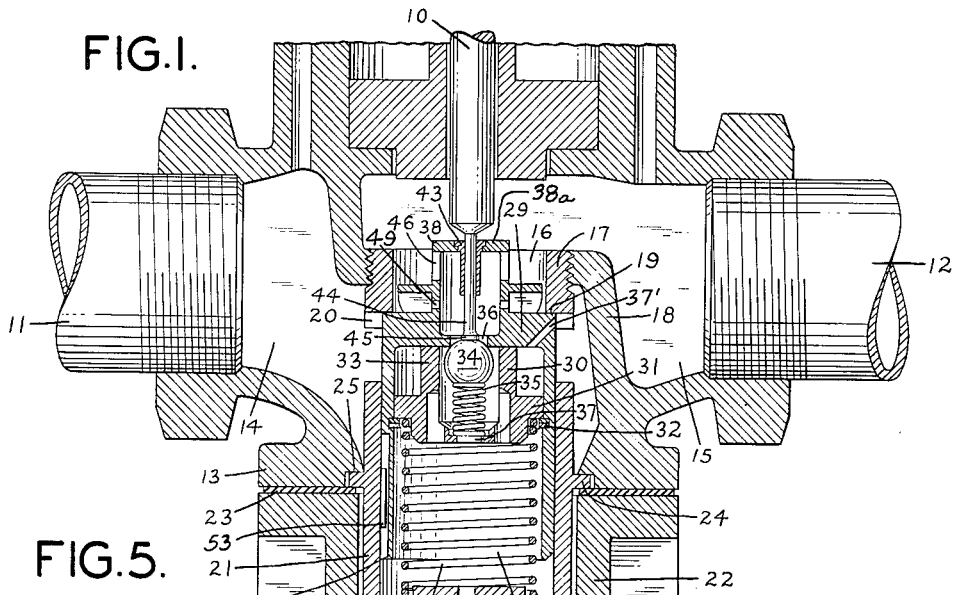
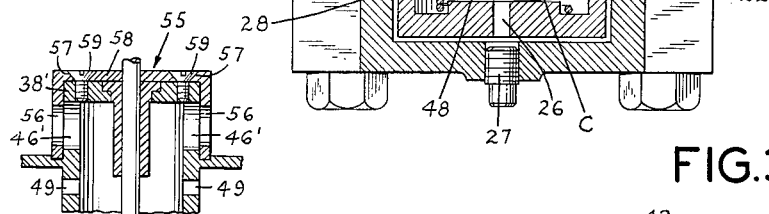
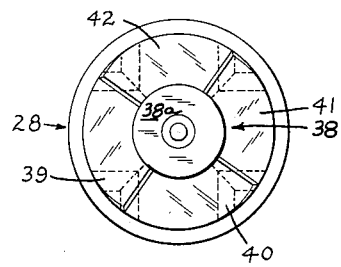
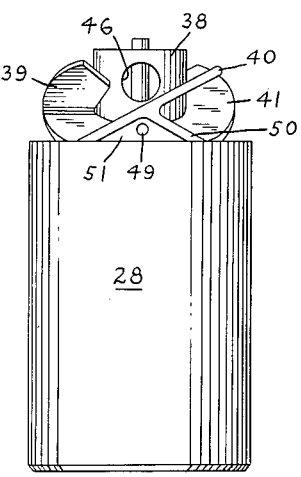
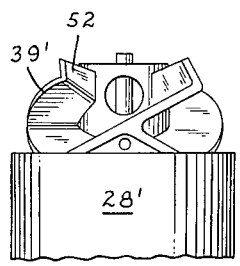
INVENTOR
HENRY W. ANGELERY
BY
HIS ATTORNEYS Oct. 26, 1965  H. W. ANGELERY  3,213,887
DYNAMICALLY BALANCED VALVE
Filed Aug. 10, 1964  2 Sheets-Sheet 2

INVENTOR
HENRY W. ANGELERY
BY
Brumbaugh, Free, Graves & Donohue
HIS ATTORNEYS

United States Patent Office 3,213,887
Patented Oct. 26, 1965

3,213,887
DYNAMICALLY BALANCED VALVE
Henry W. Angelery, 19 Gwynne Court, Northvale, N.J.
Filed Aug. 10, 1964, Ser. No. 388,561
9 Claims. (Cl. 137—630.15)

This is a continuation-in-part of my application Serial No. 217,101 filed August 15, 1962, now abandoned.

This invention relates to improvements in valves and more particularly to valves which are stable, i.e., free of fluttering, hunting or chattering under varying fluid flows and fluid pressures.

The instability of prior valves depends on valve plug movement and the closeness of the valve plug to its seat. Such movement is effected by the aspirating force and the kinetic energy forces created by the throttling action of the pressure drop across the valve seat and plug during variable flow conditions. I have found that the kinetic energy forces can resolve into four additional forces other than the aspirating force, namely, impulse, reaction, recompression and expansion forces which act on the valve plug to urge it away from its seat. While these four forces can be supported and neutralized under high fluid flow conditions by the use of a powerful spring urging the plug toward its seat, an equally powerful valve actuator is required to open the valve thereby requiring, for example, in a diaphragm actuated valve, an excessively large diaphragm or an excessively high diaphragm actuating pressure. In many installations, large diaphragms and high actuating pressures are not feasible.

I have found also that with valves used at very low flow rates and with very high pressure differentials, a static supporting pressure or unbalanced force created before flow occurs will not serve to maintain plug stability. The operating force for opening the valve must reach static balance with the static supporting forces in order to enable plug movement. When the plug is moved, a change in flow occurs, which immediately causes a change in the forces of aspiration, impulse and reaction. These changed forces must be balanced instantaneously by an additional supporting force created by the kinetic energy released by the throttling action of the valve, if plug stability is to be maintained.

In accordance with the present invention, a new form of valve plug is provided by means of which the forces created by flow of fluid through the valve are resolved into a balancing force for maintaining valve plug stability under any and all variations of flow or pressure differential across the valve.

More particularly, the new valve is provided with vanes and holes in the path of flow of the fluid by means of which the potential energy in a fluid (converted into kinetic form by the throttling process in passing through the valve seat) is picked up in the kinetic form and reconverted into the potential form to support the valve. If further change occurs (as by further opening of the valve) the kinetic energy of the fluid sets against the vanes to create a lifting force which maintains valve plug position. These two forces can act in combination or separately.

For a better understanding of the present invention, reference may be had to the accompanying drawings, in which:

FIGURE 1 is a view in vertical section through a portion of a valve including a valve plug embodying the present invention;

FIGURE 2 is a side elevational view of the valve plug embodying the invention;

FIGURE 3 is an end elevational view thereof;

FIGURE 4 is a side elevational view of the upper portion of the valve plug showing a modified form of vane structure thereon; and FIGURE 5 is a view in vertical section through the upper portion of the valve plug showing an adjusting member for adjusting the size of the aspirating passages in the valve plug.

Figure 6:
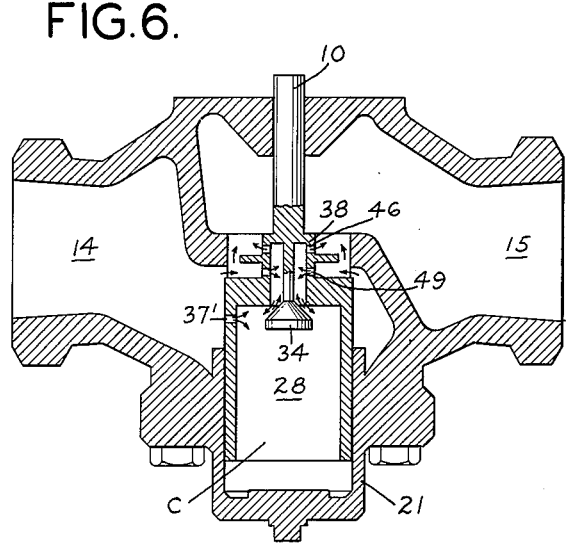
FIGURES 6 and 7 are schematic illustrations of the operation of the valve during opening and in a stabilized condition.

A typical embodiment of the invention will be described with reference to its use in a flow regulating valve of the type disclosed in my U.S. Patent No. 2,805,039, dated Sept. 3, 1957. This valve, as shown in FIGURE 1, includes a plunger 10 actuated by means of a diaphragm (not shown) which is deflected by means of fluid pressure in order to control the flow of fluid from a pressure line 11 to a discharge line 12 connected to a valve casing 13. Suitable passages 14 and 15 in the valve casing 13 communicate with each other through a valve port 16 comprising a valve seat ring 17 mounted in a partition 18 interposed between the passages 14 and 15. As illustrated, the valve seat ring 17 is provided with a plane valve seat 19, although it can be a tapered conical valve seat or any other form of seat as may be desired. Lugs 20 are formed on the ring 17 to enable it to be screwed into the partition 18.

A generally cup-shaped valve guide 21 is supported in the passage 14 by means of an end cover plate 22 and a sealing ring 23 which engages a flange 24 on the valve guide 21 and urges the flange against a shoulder 25 at the lower end of the housing 13. A drain opening 26 in the bottom of the valve guide 21 enables condensate or liquid to be drained by removal of a drain plug 27 in the cover plate 22. The structure thus far described is conventional.

Slidably mounted in the guide 21 is a hollow, generally cylindrical valve plug 28 having a head 29, the peripheral edges of which are adapted to engage the valve seat surface 19 and effect a seal therewith. The plug 28 and the sleeve 21 form a chamber C for receiving fluid pressure for balancing the valve 28 as will be explained hereinafter. With the cylindrical valve member 28 is a housing 30 including a radial flange 31 supported by snap rings 32 to retain the upper end of a sleeve 33 in engagement with the underside of the valve plug head 29. A ball valve 34 is mounted within the sleeve and is biased by means of a spring 35 into sealing engagement with a passage 36 in the head 29 of the valve plug. An opening 37 in the bottom of the housing 30 equalizes the pressures in the sleeve 33 and in the valve guide 21. The pressure in the chamber C between the valve 28 and the guide 21 is equalized with the pressure in the passage 14 by means of a bleed port 37' in the plug 28 when the valve plug 28 and valve 34 are seated.

Extending upwardly from the head 29 of the valve plug is a tubular extension 38 around which extend, as shown in FIGURES 2 and 3, inclined vanes 39, 40, 41 and 42. The vanes may be integral with the extension 38 and extend down and have their lower ends united with the valve head 29.

The upper end of the extension 38 is provided with a disk-like closure 38a carrying a bearing or bushing 43 through which a rod-like extension 44 on the lower end of the valve actuating rod extends. An enlargement 45 on the end of the extension 44 is adapted to engage the ball 34. Downward movement of the actuating rod 10 displaces the ball from its seat to equalize the pressures in the chamber C and in the passage 15, thereby to enable downward displacement of the valve plug 28 by further downward movement of the actuating rod 10 and engagement of its lower end with the end closure 38a or bushing 43 in the extension of the valve plug.

As described more particularly in my Patent No. 2,805,039, the extension 38 is provided with one or more aspirating passages 46 by means of which the aspirating action of the fluid flowing between the valve plug and the seal 19 quickly equalizes the pressure on opposite sides of the valve thereby to stabilize it against the aspirating effects of fluid flow through the valve.

Figure 7:
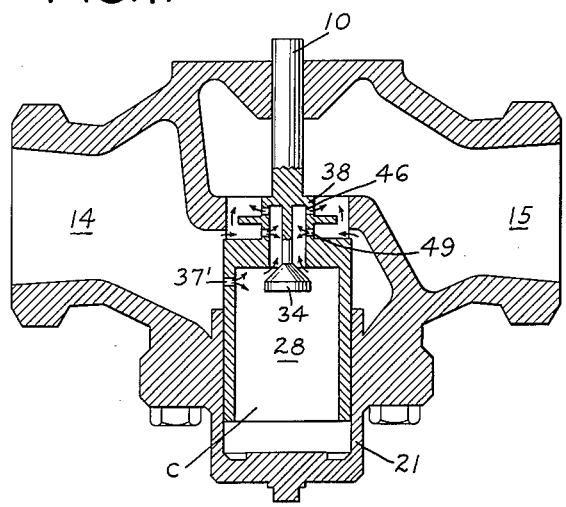

In addition to the aspirating action of the fluid which tends to render the valve unstable and which is overcome by the aspirating passages 46, the flow of fluid creates additional forces, namely, impulse, reaction, recompression, and expansion forces which tend to move the valve in a direction to unseat it, that is, to compress the valve seating spring 48 interposed between the housing 30 and the bottom of the valve guide 21 and thereby cause the valve to open farther than desired and cause chattering or hunting to occur. Neutralization of these forces are overcome, in part, by the vanes 39 to 42. These vanes are in the path of flow of the fluid and tend to deflect it and convert the energy therein into heat and at the same time, because of impact of the fluid thereagainst to aid the spring 48 in supporting the valve and provide greater resistance to further opening of the valve. In addition, below the vanes, a series of impact ports 49 are provided into which a portion of the fluid is diverted by the vanes 39 to 42 and the short oppositely inclined vanes 50 etc. associated with each vane 39 to 42. Impact passages 51 are formed by the vanes around each of the impact openings 49. The impact force of the fluid causes it to flow through the passages 49 as illustrated by the arrows in FIG. 6, increasing the pressure in the chamber C behind the valve plug 28 and providing additional supporting force for the valve, adding to the supporting action of the spring 48 and neutralizing the impulse, reaction, recompression and expansion forces. Some of the fluid pressure is released through the aspirating ports, but equilibrium is established essentially instantaneously as shown in FIG. 7 within the chamber C and the extension 38 and in the inflow and outflow through the ports 37', 46 and 49 so that the valve plug 28 is supported statically and dynamically in any of its partially or fully open positions. In other words, the forces normally tending to momentarily unseat the valve farther than the movement caused by the actuating rod 10 are instantaneously opposed by increased pressure within the chamber C and by the force exerted on the vanes 39 to 42. The valve plug, accordingly, is stabilized in the position in which it is moved by the actuating rod even when there is a rapid variation or fluctuation in the rate of flow from, or pressure differential between, the pressure line 11 and the discharge line 12.

Inasmuch as the inclination of the vanes 39 to 42 may have a tendency to cause the valve plug 28 to rotate, and in some instances such rotation may be undesirable, rotation can be prevented by reversely directing the upper ends of the vanes as shown particularly in FIGURE 4. Thus the vanes 39' etc. are provided with reversely bent upper ends 52 of such inclination as to offset for the normal tendency of the plug 28 to rotate.

Rotation of the valve plug 28 can also be prevented by means of a mating spline and groove 53 in the sleeve 21 and plug 28.

This inclination of the vanes 39 to 42 can be varied depending upon operating conditions, such as high or low pressure operating conditions, and likewise the sizes of the aspirating passages 46 and impact passages 49 may be varied as may be required to obtain the necessary stability. Moveover, by adjusting the ratios of the size of the ports 46 and 49, the movement of the plug 28 produces an arithmetic change in the rate of flow through the valve instead of a geometric change in the flow rate with respect to an arithmetic change in the force exerted on the stem 10. In a typical example which is useful under most conditions, the aspirating passages 46 may have a diameter about four times as great as the diameter of the impact passages 49. At higher pressure differentials, the ratio can be less than 4 to 1 and at lower pressure differentials it must be greater than 4 to 1. If desired, means such as inserts or an adjustable member may be provided for changing the ratio as required. The ratio of the openings for practical purposes can be varied from about 1 to 2 to 20 to 1.

A typical means for adjusting the ratios of the passages 46 and 49 is shown in FIG. 5. An inverted cup-like sleeve 55 is rotatably mounted on the extension 38' and has openings 56 therein generally corresponding to the aspirating passages 46' in size and position. Rotation of the sleeve 55 enables the openings 56 to be moved into alignment and coincidence with the passages 46' or partially out of alignment and partially out of coincidence with the passages 46'. In this way the effective size of the passages 46' and the ratio of the areas of the impact passages to the area of aspirating passages can be adjusted as indicated above. Suitable arcuate slots 57 in the top 58 of the sleeve 55 receive screws 59 threaded into the top of the extension 38' to secure the sleeve 55 in adjusted position.

From the preceding description, it will be apparent that a valve has been provided which is unaffected by variations in pressure and flow of fluid therethrough and will remain stable under any and all conditions of operation.

It will be understood that the size and shape of the valve, the manner in which it is mounted in the valve guide or valve casing, and details of the valve seat and mating surface of the valve plug itself may be modified in accordance with requirements. Accordingly, the forms of the invention described should be considered as illustrative and the invention is not intended to be limited other than as defined in the following claims.

I claim:

1. A statically and dynamically balanced valve comprising a casing having an inlet passage and a discharge passage, a valve port connecting said passages, a first valve seat in said port, a valve plug engageable with said seat for disconnecting said passages and subjected on its opposite sides to the pressures in said passages, said valve plug being movable away from said seat to permit flow of fluid through said seat, a second valve seat in said valve plug, a valve member engageable with said second seat and displacable therefrom to enable fluid to flow therethrough, a tubular extension on said valve plug extending through said first valve seat in spaced relation thereto and communicating with said second valve seat, at least one inclined vane extending outwardly from said extension and having its outer periphery spaced from said seat to provide space for flow of fluid therebetween, a first port in said tubular extension between said vane and said valve plug, a second port on the opposite side of said vane from said first port, said ports communicating through said tubular extension with said second valve seat, means for displacing said valve member and said valve plug from their seats to allow fluid to flow through said seats, said first port being subjected to an impact action of the fluid flowing through said first valve seat, and said second port being subjected to an aspiration action of fluid flowing along said extension at said opposite side of said vane to neutralize forces acting on said valve plug and stabilize it.

2. The valve set forth in claim 1 comprising a plurality of said vanes inclined to the axis of said extension and extending around said extension.

3. The valve set forth in claim 1 in which said means for directing fluid comprises a vane member inclined oppositely to said one vane and defining therewith an impact passage for directing fluid toward said port on said one side of said vane.

4. The valve set forth in claim 1 comprising a plurality of said vanes inclined to the axis of and extending around said extension, said vanes having reversely extending end portions spaced from said valve plug to stabilize said valve plug against rotation.

5. The valve set forth in claim 4 in which said means for directing fluid comprises a vane member inclined oppositely to and extending from at least one of said vanes to said valve plug and defining therewith an outwardly opening passage surrounding and communicating with the port on said one side of said vane for directing fluid flowing through said first valve seat into said extension.

6. The valve set forth in claim 1 in which the ratio of the diameter of said one port to the diameter of the port on said opposite side of said vane is between about one to twenty and about two to one.

7. The valve set forth in claim 6 comprising means on said plug for changing the relative sizes of said ports on opposite sides of said vanes to change said ratio.

8. The valve set forth in claim 6 comprising a sleeve movably mounted on said plug and having an opening therein corresponding to said one port, said sleeve being movable between a position in which said opening coincides with said one port and a position in which said opening is at least partially out of coincidence with said one port.

9. A statically and dynamically balanced valve comprising a casing having an inlet passage and a discharge passage, a valve port connecting said passages, a first valve seat in said port, a valve plug engageable with said seat for disconnecting said passages and subjected on its opposite sides to the pressures in said passages, said valve plug being movable away from said seat to permit flow of fluid through said seat, a pressure balancing chamber receiving said valve plug, a second valve seat in said valve plug, a valve member engageable with said second seat and displaceable therefrom to enable fluid to flow therethrough, a first means on said valve plug in the path of fluid flowing between said first seat and said valve plug responsive to kinetic force developed by flow of fluid through said first valve seat for urging said valve plug toward said first seat, and second means on said valve plug responsive to flow of fluid through said valve seat for substantially instantaneously changing the fluid pressure in said chamber to oppose forces of aspiration, impulse and reaction released by flow of fluid through said valve seat.

References Cited by the Examiner
UNITED STATES PATENTS

| | | | |
|---|---|---|---|
| 204,278 | 5/78 | Anderson | 251—208 X |
| 1,540,529 | 6/25 | Blaisdell | 251—126 X |
| 1,571,604 | 2/26 | Ryan | 251—127 X |
| 2,805,039 | 9/57 | Angelery | 251—233 X |

FOREIGN PATENTS

| | | |
|---|---|---|
| 2,458 | 1897 | Great Britain. |
| 13,102 | 1913 | Great Britain. |

ISADOR WEIL, *Primary Examiner.*

WILLIAM F. O'DEA, *Examiner.*